April 14, 1964 W. D. ALLINGHAM 3,128,989
TURBINE OVERSPEED CONTROL
Filed Nov. 7, 1960 6 Sheets-Sheet 5

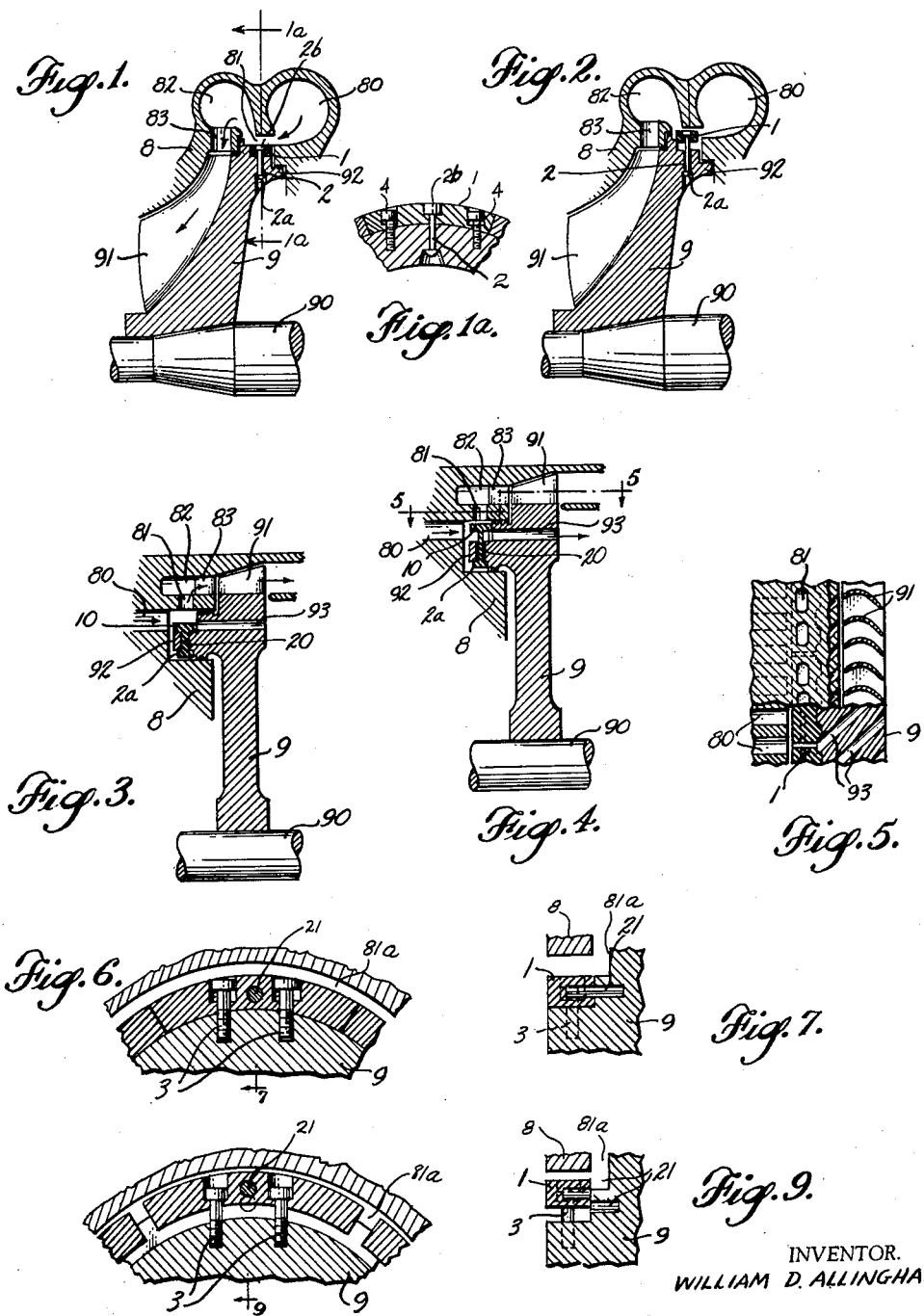

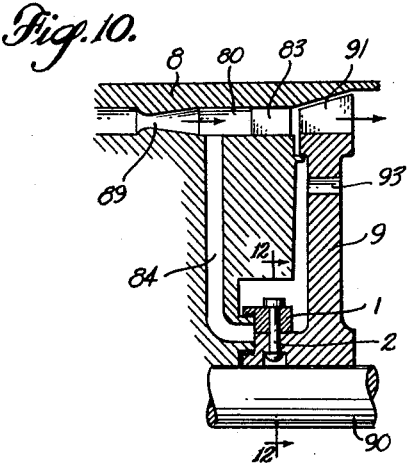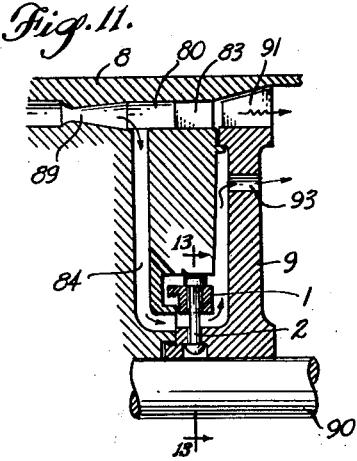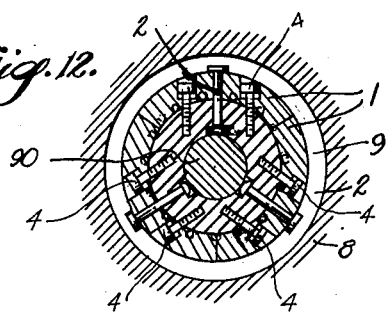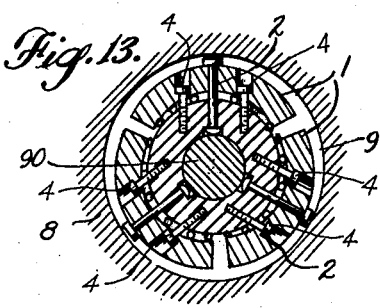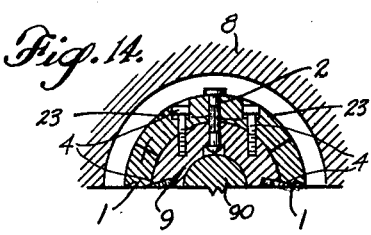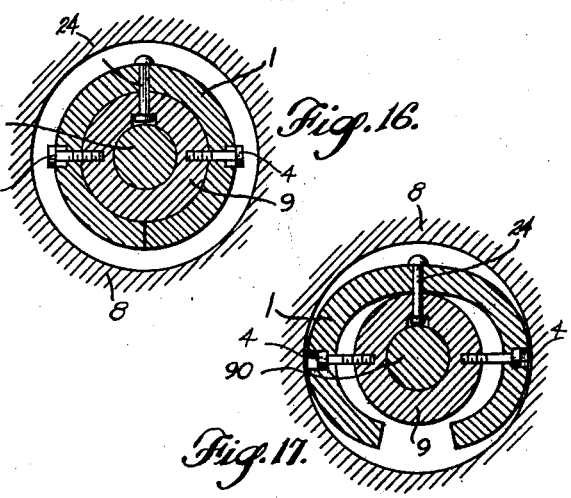

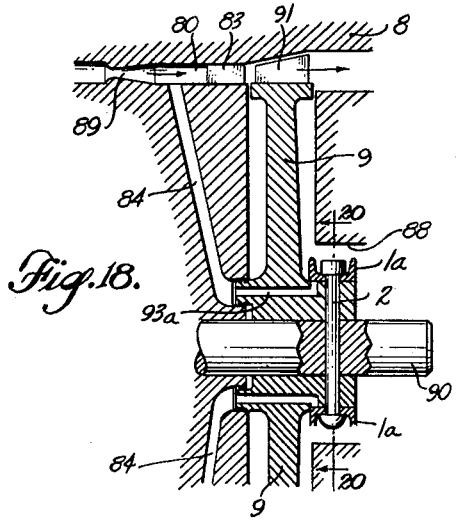
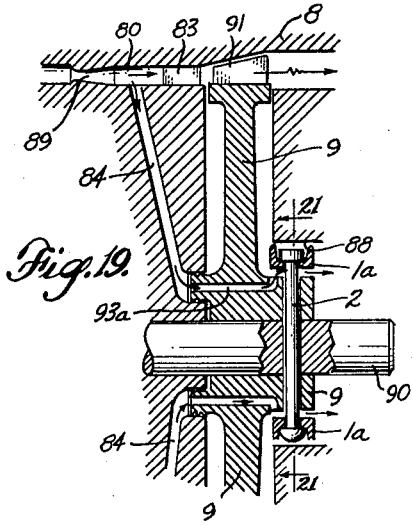
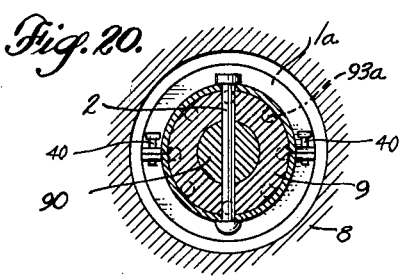
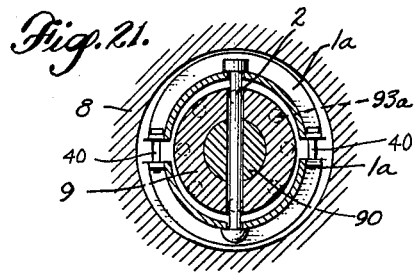
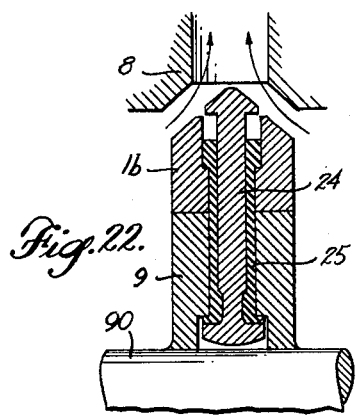
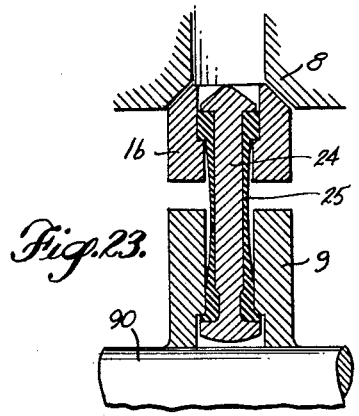

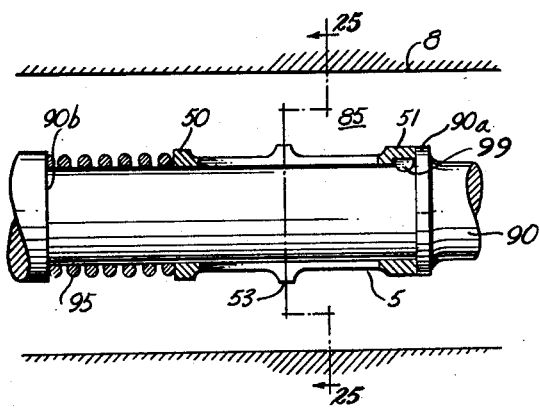
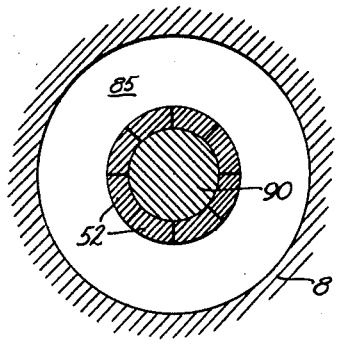
Fig. 24.   Fig. 25.
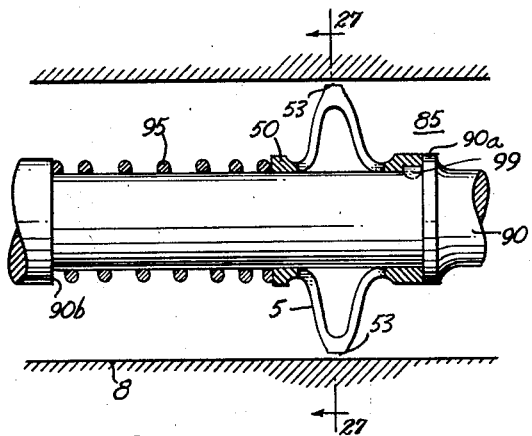
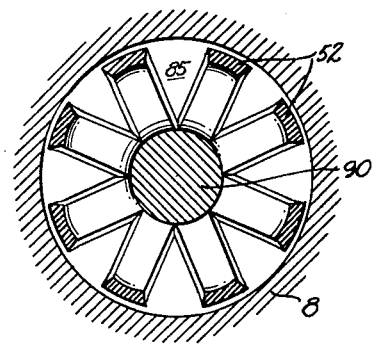
Fig. 26.   Fig. 27.

INVENTOR.
WILLIAM D. ALLINGHAM
BY
Reynolds + Christensen
ATTORNEYS

United States Patent Office 3,128,989
Patented Apr. 14, 1964

3,128,989
TURBINE OVERSPEED CONTROL
William D. Allingham, 12223 25th Ave. SW.,
Seattle 66, Wash.
Filed Nov. 7, 1960, Ser. No. 67,672
24 Claims. (Cl. 253—59)

This application is a continuation-in-part of application Serial Number 688,692, filed October 7, 1957, now abandoned.

It is explained in my copending application Serial No. 647,000, filed March 19, 1957, now Patent No. 2,962,257, issued November 29, 1960, that rotors which operate at very high rotational speeds, in the range, for example, including 30,000 r.p.m., produce a high centrifugal force acting upon the rotor and tending to burst it. Such rotors are very frequently the bladed rotors of gas turbine engines or of compressors. In such machines the rotors are designed to resist the centrifugal forces which are generated by operation within the design speed range, but occasionally such rotors tend to overspeed, and the margin between a safe speed within the design speed range and a dangerous overspeed is relatively narrow, and unless the tendency to overspeed is automatically checked promptly, and before the design speed range has been greatly exceeded, the rotor is likely to burst.

In my patent identified above the remedy proposed is to provide the rotor assembly with a unitary ductile ring, rotating therewith and so subject to centrifugal force, the ring being of a metal and of a size and material chosen to have the ability to withstand centrifugal forces within the design speed range, but sufficiently ductile that upon exceeding the design speed range by any appreciable or given amount, but still at a speed such that the rotor assembly is well within its safe upper limit, the ring will yield plastically and permanently radially outwardly as a whole, and will thereby effect or initiate remedial measures which will slow down the rotor and prevent its bursting, and will insure that the rotor cannot again speed up, until steps have been taken to cure the cause of overspeed. It would be scarcely practical to have such plastic yielding occur if the rotor speed exceeds the design speed range by any or only a small amount, for that may be a purely fortuitous happening, quickly halted otherwise, and the rotor will normally be designed that it has some margin of safety, although a narrow one. The ring should therefore be so designed that its plastic yielding occurs whenever its rotative speed exceeds the design speed range by a given amount, although still well within the safe limit of the rotor.

The same result can be achieved otherwise and better than by a complete unitary ductile ring, namely, by a ring that, being segmental initially, does not require yielding of the ring as a whole to initiate corrective action, but corrective action depends rather upon the yielding of a specific rupturable or yieldable element that may or may not be a part of the segmental ring.

It has been found much easier to design specific yieldable means which themselves will yield at a given centrifugal force, and which will not require the uniform yielding of the entire ring. The ring, therefore, in the present invention is substantially continuous and uniform when parts are operating within the design speed range, but is formed of segments, each of which is joined to other such segments, or is supported from the rotor, in a manner and by means which will yield and so permit outward movement of the segment, rather than the ring as a whole, upon the occurrence of a dangerous overspeed. The aim is always to effect yielding of all such ring retaining members and their ring segments simultaneously, but by permitting the possibility of yielding of one thereof the main objective of preventing a runaway overspeed can usually be achieved with the use of plastically yieldable retaining members, which can be designed to yield at a more precise limit upon the imposition of a given stress, and which can be replaced more readily to restore the rotor assembly to its initial operative condition. The yielding referred to is that occurring after the material is stressed beyond the limit of elastic yielding, and is stressed within its plastic range. Elements so yielding will not return to their initial size or shape, since they have yielded beyond their yield point, as that term is used herein.

According to the present invention the yieldable part may take a variety of forms, such as a rivet, bolt or the like extensible in tension, or a pin or similar element yielding in shear, or the ring itself or the means joining ring segments in the ring form, may have an inherent tendency to retain its circular form until the yield point is reached, whereupon it will yield in bending, or yielding may be accomplished by a buckling of a yieldable ring-retaining or ring-forming member.

As in the issued patent, the limiting of rotor speed may be made accomplished in several ways, singularly or in combination. For example, radial outward movement of the segments of the ring may shut off the supply of motive fluid to rotor blades, or in combination with a flow-limiting venturi located upstream, it may open a by-pass passage for motive fluid around the rotor blades, thus reducing the quantity of fluid reaching the rotor blades and the pressure ratio, hence the power supply to the rotor. Rubbing of the outwardly yielded rotating segments upon a fixed housing part surrounding them may occur as an incident in some designs, but friction in such event is minimized by providing a rubbing ring of a low coefficient of friction. Friction is never to be relied upon as a speed-lessening agency. The metal in such rotors is quite highly heated in normal use, and at the rotative speeds dealt with here frictional rubbing of metal on metal will melt away the rubbing surfaces in a matter of seconds, after which it is not only of no effect in lessening the rotor speed, but may have so weakened the housing that the bursting of the rotor could rupture the housing. In all instances lessening of the rotor speed is intended to be effected solely by altering, that is, by lessening or bypassing the supply of motive fluid.

In the present invention the yieldable ring may be located at any of several points. For instance, it may be located at the periphery of the rotor, where the centrifugal effect thereon is the greatest, or at the rotor hub, or on the shaft of the rotor, where the centrifugal effect is the least, or at some point intermediate these two limit positions.

Differing from the disclosure in the issued patent, the ring is shown in certain instances herein as located close to the axis of rotation, and such location has several advantages. It reduces the kinetic energy of the segmental parts at the time of yielding, and permits a design having considerable thickness of housing around the yielding parts, thereby better insuring their containment.

Containment of the yielded ring is of course necessary, but it is emphasized that frictional rubbing of the ring upon surrounding surfaces of the housing is to be avoided insofar as that is possible, while still containing the yielded and rotating ring. Reliance for stopping the rotor, according to this invention, is placed upon the alteration of the motive fluid supply to the rotor blades by yielding of the ring and its movement to a position other than its position during normal operation. Alteration of the motive fluid supply may entail by-passing part or all thereof around the rotor blades, as has been suggested above, or cessation of the supply of motive fluid, or direction of a part or all of the motive fluid through reversely pitched rotor blades, to effect positive reversal of the motive forces active upon the rotor.

Whereas plastic yielding of the ring-retaining elements is intended by this invention, a limitation upon the extent of yielding is also intended. This permits yielding within the plastic range to alter the supply of motive fluid in a manner to decrease the rotor's speed, and yet prevents yielding to an extent to produce frictional rubbing of the yielded ring upon a stationary housing. The housing can be made to contain the ring should it, in any case, disintegrate.

The design of the overspeed elements will, of course, depend on several factors, such as the diameter of the rotor, the normal or designed rotor speed range, motive fluid flow rate, etc. A number of parameters may be varied to achieve a practical design, such as (1) the number of segments; the use of a larger number reduces the load on the yielding element; (2) cross section of the segments, that is, a solid rectangular cross section may be used or a tubular or channel cross section as in other forms illustrated, to reduce the mass and increase the rigidity of the segments; (3) radial distance to the centroid of the segments; with a smaller radius the load on the yielding element at any given rotational speed is reduced; (4) material of the yielding element, a proper material being selected to have the required yield strength to meet the design requirement; (5) density of material in the segment and yielding element; the use of low density material decreases the load on the yielding element.

The principles of the invention having been described in general terms above, and the factors stated which affect the choice or design thereof, the invention will be more clearly understood from the accompanying drawings which show diagrammatically various forms incorporating the principles of the invention, and from a study of this specification, and the distinctive features of the invention will be set forth in the appended claims.

FIGURE 1 is an axial half-sectional view through a bladed rotor incorporating the design, showing parts operating within the design speed range, FIGURE 1a is a sectional view at the line 1a—1a of FIGURE 1, and FIGURE 2 is a view similar to FIGURE 1 showing parts in the overspeed condition. These three views illustrate the use of a bolt extensible in tension under overspeed conditions.

FIGURE 3 is a view similar to FIGURE 1, and FIGURE 4 a view similar to FIGURE 2, showing a tensionally extensible element constituting the ring retaining means, but formed as an integral part of the ring itself. FIGURE 5 is a sectional view taken at the line 5—5 of FIGURE 4 and illustrating the effect of yielding.

Figure 28:
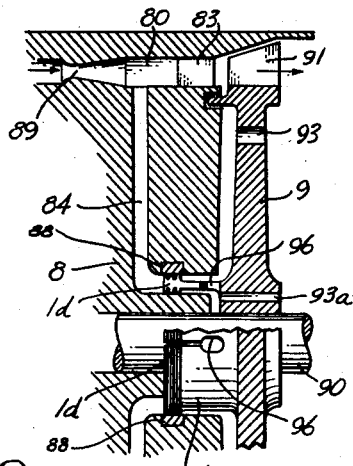

FIGURE 6 is a detail sectional view transverse to the axis, and FIGURE 7 is a sectional view at the line 7—7 of FIGURE 6, illustrating the use of a ring retaining member which is yieldable in shear, but also showing yield-limiting means to limit movement of the ring, the parts being shown in the proper position for operation within the normal speed range, and FIGURE 8 is a view similar to FIGURE 6, and FIGURE 9 a section at 9—9 of FIGURE 8 similar to FIGURE 7, showing the parts in the overspeed condition, and with limit-stop elements limiting the movement of the ring elements to avoid rubbing contact thereof with a containing housing.

FIGURE 10 is a view similar to FIGURE 1, and FIGURE 11 is a view similar to FIGURE 2, both illustrating bolts or rivets tensionally extensible with overspeed, but located near the rotative axis, FIGURE 10 showing parts in the normal position, and FIGURE 11 in the overspeed condition. FIGURE 12 is a transverse sectional view at the line 12—12 of FIGURE 10, and FIGURE 13 is a similar view at the line 13—13 of FIGURE 11. FIGURE 14 is a view similar to FIGURE 12, but illustrating the use of a bolt of reduced section for yielding with the application of a lesser force.

FIGURE 15 is an isometric view of the rivet and sleeve used therewith in the form of FIGURE 14.

FIGURE 16 is a view similar to FIGURES 12, 13 and 14, but showing a ring which is split and which in effect is a single segment of 360°, the ring itself having sufficient inherent form-sustaining ability to retain its circular shape during operation within the normal speed range, and FIGURE 17 is a similar view but showing the ring having yielded by bending under overspeed conditions.

FIGURE 18 is an axial sectional view illustrating a modification in which the ring is formed in two segments only of considerable inherent rigidity, both segments being retained in operative relation by a single rivet or the like, assuring the yielding of both segments simultaneously and alike. FIGURE 19 is a view similar to FIGURE 18 but illustrating the overspeed condition, and FIGURES 20 and 21 are cross-sectional views at the respective lines 20—20 of FIGURE 18 and 21—21 of FIGURE 19.

FIGURE 22 is an axial sectional view of a further modification employing a nonyielding but movement-limiting bolt, with a sleeve surrounding the bolt and yieldable in tension to the extent permitted by the limit stop provided by the bolt. FIGURE 22 illustrates the condition with parts operating within the design speed range, and FIGURE 23 illustrates the overspeed condition.

FIGURE 24 is an axial sectional view of a form of the invention in which the yieldable member buckles in the axial direction, and thereby is caused to expand radially. FIGURE 24 illustrates the parts during operation within the design speed range, and FIGURE 25 is a transverse sectional view at the line 25—25 of FIGURE 24.

FIGURE 26 is a view similar to FIGURE 24, and FIGURE 27 is a section at the line 27—27 of FIGURE 26, these two views illustrating the condition of parts upon the occurrence of overspeed.

Figure 29:
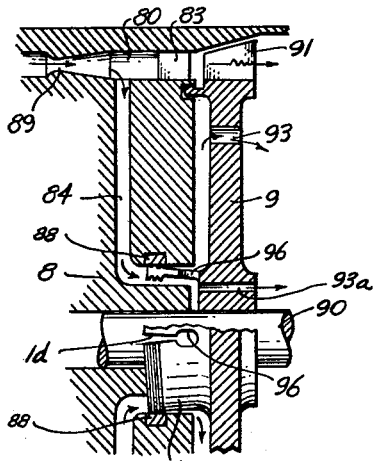

FIGURE 28 is a view similar to FIGURE 1, but illustrating a segmental ring mounted upon the rotor as an integral part thereof and yieldable in bending, and FIGURE 29 is a similar view but showing the parts in the overspeed condition.

Figure 30:
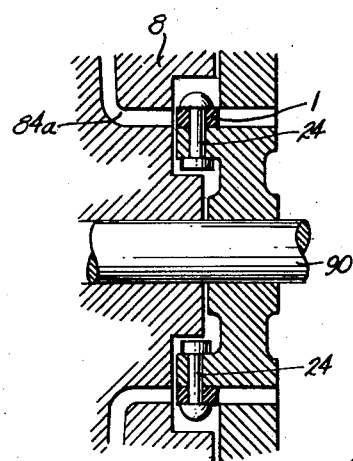
Figure 31:
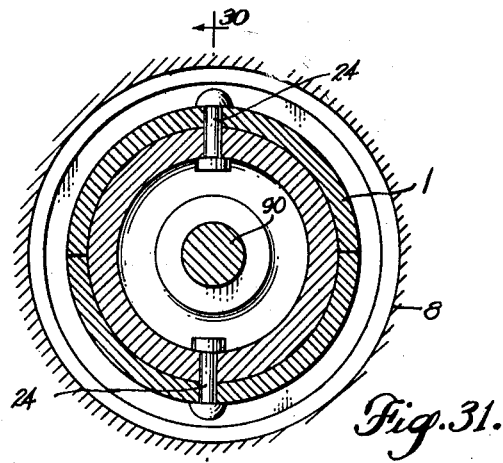
Figure 32:
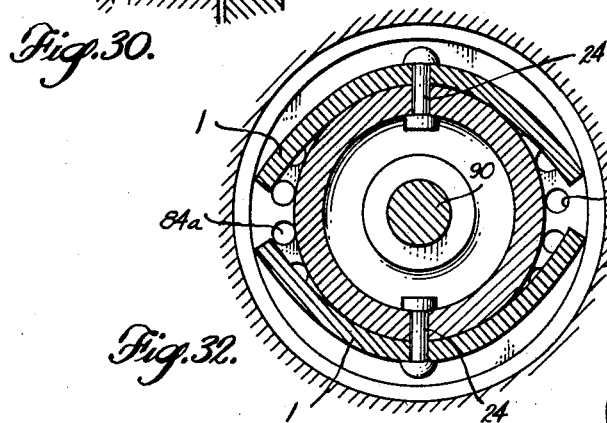

FIGURE 30 is an axial sectional view at the line 30—30 of FIGURE 31, and illustrating the employment of nonyieldable ring retaining means, but the ring segments themselves are yieldable in bending. FIGURE 30, and FIGURE 31 which is a transverse sectional view of the same, illustrate the condition when parts are operating within the design speed range, and FIGURE 32 is a view similar to FIGURE 31 but showing the overspeed condition.

Figure 33:
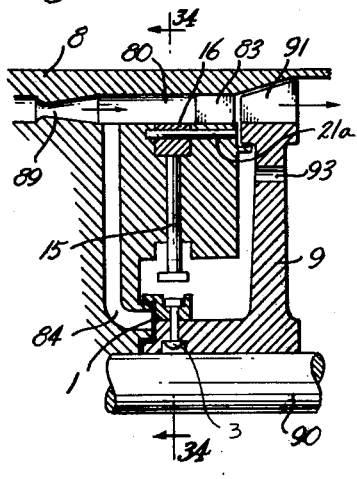
Figure 34:
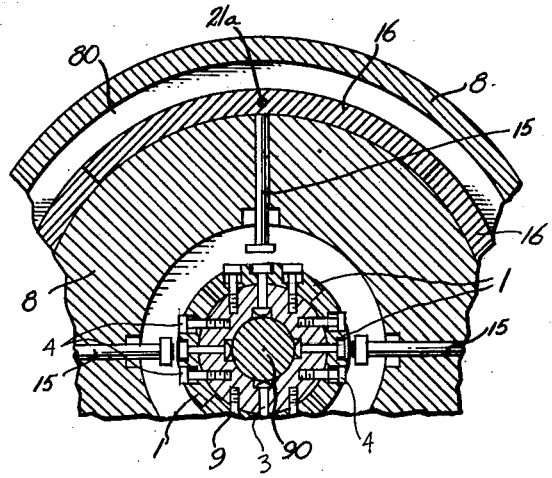
Figure 35:
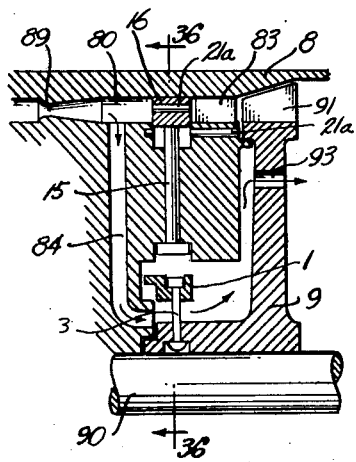

FIGURE 33 is a view similar to FIGURE 10, but illustrating the segmental ring adjacent the axis which can restrict a fluid passage near the periphery; FIGURE 34 is a transverse sectional view of the same at line 34—34 of FIGURE 33. These views show parts in normal relationship, whereas FIGURE 35 is a view corresponding to FIGURE 33, and FIGURE 36 a view corresponding to FIGURE 34, showing parts after yielding of the yieldable elements.

The principles of the invention are illustrated in FIGURES 1 to 5 inclusive. A rotor assembly comprises the rotor 9 upon a shaft 90, rotating within a housing 8 formed with passages 80, 81 and 82, such as may lead to a nozzle box 83, and to blades 91 of the rotor. The rotor in this instance is provided with a flange 92 about which extends and upon which rests a ring formed of segments 1. In the form of FIGURES 1 and 2, each segment 1 is secured to the flange 92 and so to the rotor by means of a rivet or bolt 2 disposed radially and passing through both the flange 92 and the ring segment 1. In the form of FIGURES 3 and 4, the corresponding tensional member 20 is formed as part of the ring segment 10. In either instance, a head 2a at the inner end and 2b at the outer end (or in the case of FIGURES 3 and 4, the ring itself at the outer end of the tensional member 2 or 20), retains the ring firmly seated against the rotor which supports it, and with which it rotates. If the fastening means are prestressed, as by driving rivets hot or by tightening the bolts to stress them, loosening of the ring during normal operation can be prevented, and plastic yielding, when it occurs comes suddenly.

The material and size of the rivet or bolt 2 or of the tensional member 20 are so chosen that it will become ductile or plastic and will elongate beyond its yield point, yet with substantially slight elastic yieldability prior to that time, upon the attainment of a rotational speed and consequent centrifugal force applied to the segment and so to the ring retaining member, which is in excess of the design speed range. The remainder of the rotor assembly, including elements 4 that limit outward movement of ring segments to avoid frictional contact with the housing 8, is so designed that the yield point is reached at a speed that is appreciably higher than the speed at which the yield point of the rivets or bolts 2, 20, or the like is reached. The yield point of yield-limiting means 4 is not reached at a speed where the elements 2 yield plastically. When plastic yielding of members 2 or 20 occurs, the member 2 or 20 will elongate (compare FIGURE 2 with FIGURE 1, and FIGURE 4 with FIGURE 3) and allow each segment, the retaining means whereof has yielded, to move outwardly. Normally all retaining means will yield simultaneously. Their outward movement is halted by elements 4, and no frictional rubbing of the ring segments on the housing occurs.

In the case of the form illustrated in FIGURES 1, 1a, and 2, such outward movement of the ring segments blocks the passage 81 by which the motive fluid passes from passage 80 to passage 82, and so to the blades 91, and the rotor in consequence slows down, being deprived of motive fluid. A similar result occurs in the form of FIGURES 3 and 4, but an additional result is obtained there, namely, that the elongation and consequent radial contraction of the tensional member 20 opens a passage through the aperture wherein it is received, and permits access of the motive fluid to a by-pass 93 in the rotor 9, which insures that a certain proportion of the motive fluid will by-pass the blades 91, even though some of the motive fluid should still continue to impinge upon the blades, and this, in conjunction with a sonic venturi 89 discussed in relation to FIGURES 10 and 11, will have the effect of depriving the rotor of motive fluid, and, in addition, by its shearing effect upon the stream of motive fluid will tend to slow down the rotor. In this form, as in others, limit-stop means are used to limit outward movement of the ring segments, and to prevent their rubbing.

In the form shown in FIGURES 6 to 9, inclusive, the segments 1 are secured to the rotor 9 by shear pins 21 extending in the axial direction. Each such shear pin is designed to yield upon the application to the segment 1 which it retains of a given centrifugal force arising from rotation beyond the design speed range. FIGURES 6 and 7 show the normal condition while operating within the design speed range and FIGURES 8 and 9 show the shear pin 21 sheared off and the segments moved radially outwardly. Stop means such as the headed bolts 3 received in the rotor 9 pass through the segments 1, the stop bolts 3 extending generally in the radial direction, and serving to limit the radial outward movement of the segments so that frictional rubbing does not occur. (Compare FIGURES 6 and 8.) Shearing of the shear pins and outward movement of the segments may tend to close a passage 81a by which motive fluid passes to a nozzle box.

The form shown in FIGURES 10 and 11 resembles that in FIGURES 3 and 4 with the exception that the segmental ring, composed of the segments 1 retained by the tensionally yieldable bolts or rivets 2, is located close to the axis of rotation, rather than near the periphery of the rotor 9. Locating the segments close to the axis has several advantages. It reduces the kinetic energy of the segmental parts at the time of yielding. This in turn requires a retaining bolt 2 of considerably lesser strength, and permits the use of limiting members 4 of lesser strength. A location close to the axis permits a design having considerable thickness of housing around the yielding parts, thereby insuring their containment should they burst. FIGURES 10 and 11 in addition show the passage 80 as provided with a sonic venturi 89, a flow-limiting means which is required in all instances where a by-pass is provided, as is shown in these figures at 84. Otherwise the opening of the by-pass, with the flow path past the blades 91 still unobstructed, would merely increase the flow-rate, and no lessening of fluid flow to the blades would occur. The ring composed of the segments 1 maintains the by-pass 84 blocked off during operation within the design speed range, but upon exceeding that range and yielding of the retaining means 2, the segments move outwardly to a limited extent (compare FIGURES 12 and 13) and the by-pass 84 is open and permits escape of motive fluid by way of the passage 93. In this instance, the main passage 80 is not blocked off and reduction of rotor speed is accomplished by draining off a portion of the limited supply of motive fluid through the by-pass 84, where it does not impinge upon the rotor blades 91.

In the form just described, the ring was formed of three segments, each supported by a radially disposed and yieldable bolt 2. The number of segments, of course, can be varied, and instead of using a bolt of uniform section throughout, the bolt may have a reduced portion, as shown in FIGURES 14 and 15 at 22, or if a rivet is used it may be surrounded by complemental half sleeves 23 to fill the hole in the segment, so that the rivet may be driven, and it is the reduced portion 22 that yields. The tensile load which will cause yielding can be calculated with considerable precision, and stop elements 4 limit the consequential movement.

In the form shown in FIGURES 16 and 17, the ring 1 is merely weakened or split in the axial direction at a single point, so that it is, in effect, one segment of 360°. The bolt 24 in this instance is not intended to yield but to be nonyielding, and engages the ring 1 at its mid-point to secure the ring for rotation with the rotor. Stop means 4 limit outward movement of the ring's termini. The ring has no extraneous ring-retaining means, but is itself inherently form sustaining during operation within the design speed range, but is designed to yield plastically and permanently by bending radially outwardly upon exceeding the design speed range (compare FIGURES 16 and 17).

In the form shown in FIGURES 18 to 21, the ring segments 1a, of which there are two, are of channel shape or the like in cross section, to lighten it, and a single ring-retaining bolt 2 passing diametrally through the rotor and shaft and through the ring segments retains both segments closely against the rotor during operation within the normal speed range. The bolt itself yielding in tension with overspeed allows the ring segments to move outwardly. Since a single bolt holds both ring segments it is thereby assured upon yielding of the bolt, both segments will move radially outwardly at the same time. Limit means 40 prevent outward movement to an extent to cause rubbing friction.

In this form, the ring segments close a passage 93a in the rotor when parts are in the normal position but upon outward yielding of the segments, they open this passage and escape of motive fluid is permitted by way of the by-pass 84 and passage 93a. Here again the sonic venturi 89 is necessary. The outwardly displaced ring segments do not bear at a surface 88 of the housing, but rubbing can be permitted with a minimum of friction, as will shortly be disclosed.

Whereas FIGURES 14 and 15 illustrated a bolt having a reduced section between its ends, FIGURES 22 and 23 illustrate a bolt 24 which is nonyielding, whereby it may prevent frictional contact of the yielded ring against the housing, but which is surrounded by a ductile sleeve 25 which will yield with overspeed and permit outward movement of the ring segments 1b. In this instance, the ring segments may or may not be mounted directly upon the rotor, but by mounting them upon the shaft 90, they rotate with the rotor. Outward movement of the segments 1b tends to close fluid passages.

The form shown in FIGURES 24 to 27, inclusive, is considered a highly desirable form in that the yielding is accomplished by buckling and occurs quite suddenly upon the attainment of the required degree of overspeed. The shaft 90 may be provided with spaced shoulders 90a and 90b and a sleeve generally indicated by the numeral 5 surrounds the shaft 90 and is keyed thereto at 99. It is located intermediate the collars 90a and 90b, and a spring 95 reacting from one of the collars urges the sleeve axially against the opposite collar. This sleeve is slit intermediate its ends in the axial direction, to form between the continuous end collars 50 and 51 a plurality of individual segments 52. Preferably at the mid-point the sleeve is provided with a mass 53 of metal which extends somewhat farther radially outwardly than the remainder of the sleeve.

As the shaft and sleeve rotate with the rotor the protrusions 53 concentrate the centrifugal force and tend to fly outwardly, but the metal of which the sleeve is composed has sufficient inherent form-sustaining ability to resist any deformation by the centrifugal force until the upper limit of the design speed range has been reached or passed. At this time, and with the force of the compressed spring 95 urging the collars 50 and 51 together, the centrifugal force applicable to the protrusions 53 causes sudden outward yielding and axial contraction of the sleeve, so that it moves from the position and form of FIGURES 24 and 25 to that of FIGURES 26 and 27. Provision can be made positively, or by proportioning of the parts, to prevent rubbing contact.

The shaft may be disposed in a passage 85 through which motive fluid passes, and the expansion of the sleeve radially tends to obstruct this passage, and so to restrict the flow of motive fluid therethrough.

In the form shown in FIGURES 28 and 29, the ring 1c is formed substantially integrally with the rotor 9, but by being slit lengthwise, as indicated at 1d, it still is formed in segments though there is no means separate from the inherent stiffness of the ring itself that tends to retain it in its normal condition. Upon the attainment of a selected overspeed the segments of the ring yield outwardly, the ring being ductile under such conditions, and the ring thus yielded may open passages 96 through the housing and 93 and 93a through the rotor and afford communication between these passages and a by-pass 84. The ring segments may be permitted to rub on an inserted ring 88 of graphite or Teflon, for example, which by reason of its low coefficient of friction produces a minimum of friction and heat. Such an expedient may be employed in other forms where rubbing may be unavoidable.

In the form shown in FIGURES 30 to 32, the ring segments are secured by bolts or rivets 24 which are of the nonyielding type within the limits contemplated in the design. Two segments are shown here, but the number of segments is not material. The metal of which the ring segments 1 are formed has sufficient ability to sustain its circular form under conditions existing within the design speed range that there is no yielding, but upon the exceeding of that design speed range the segments 1 yield outwardly in bending, at their ends, in the manner shown by comparison of FIGURES 31 and 32. This may open by-passages 84a for the by-passing of motive fluid. By properly proportioning parts rubbing can be prevented.

Figure 36:
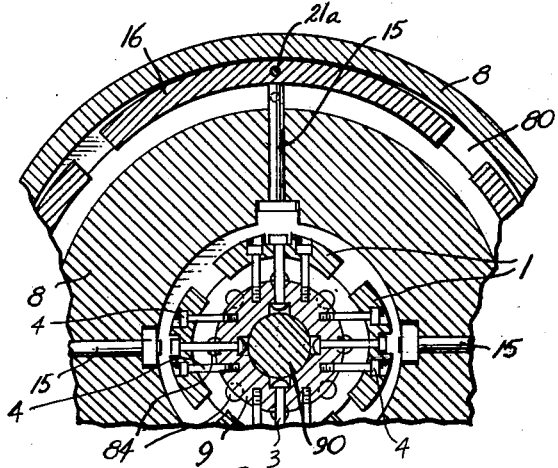

The form of FIGURES 33 to 36 resembles that of FIGURE 10, except that outward yielding of the segmental ring 1, located adjacent the axis, acts through means such as the push rods 15 to urge outwardly segments 16 located adjacent the periphery, to block, partially at least, the much larger area of passage 80 than could be blocked by the relatively small area of the ring 1 itself. The ring 1 rotates, but the segments 16 do not, wherefore it is the ring 1 which yields rather than the ring 16. However, the yieldable element may include a shear pin 21a that engages the ring segments 16, but the segments 1 should be otherwise held radially inwardly, as shown in FIGURES 34 and 36. The arrangement of FIGURES 33 to 36 enables virtual closure of the large passage 80 that leads to the nozzle box 83 under normal conditions, and diversion of the motive fluid by way of by-pass passages 84 and 93. Low-friction rubbing rings 88 may be employed here.

I claim as my invention:

1. A centrifugally operable valve construction comprising a rotatable valve seat, casing means extending thereabout and defining an annular passage with said seat, an annular valve member disposed about the seat and split axially along a radial plane thereof, and fastener means connecting said valve member with the seat for rotation therewith, one of said valve member and said fastener means being constructed of a material that will yield under the action of a predetermined centrifugal force, whereby the valve member will move radially outwardly into said passage at a rotational speed of the seat commensurate with said force.

2. In combination with a rotatable element having a designated speed range and means defining an annular passage about the element, centrifugally operable annular valve means connected about the element for rotation therewith at the inner periphery of the passage, said valve means being recessed along at least one radial plane thereof to form an axially-extending cleft therein and having a portion thereof disposed intermediate the edges of the cleft which is constructed of a material having an elastic limit corresponding to the centrifugal force generated at the upper limit of the aforementioned speed range so that said portion will yield plastically at speeds above said range to enable radially outward movement of the valve means into the passage.

3. In combination with a fluid-driven rotatable element which has a designated speed range, and means which define an annular passage about the rotatable element for the transfer of the motive fluid to the driven surface of said rotatable element, an overspeed control comprising centrifugally operable annular valve means connected about the element for rotation therewith at the inner periphery of the passage, said valve means being recessed along at least one radial plane thereof to form an axially-extending cleft therein and having a portion thereof disposed intermediate the edges of the cleft which is constructed of a material having an elastic limit corresponding to the centrifugal force generated at the upper limit of the aforementioned speed range so that said portion will yield plastically at speeds above said range to enable the valve means to alter the motive fluid supply in the passage by moving radially outwardly into such passage.

4. The combination according to claim 2 further comprising means for limiting the radially outward movement of said valve means.

5. The combination according to claim 4 wherein said limiting means includes abutment means mounted on said element for rotation therewith and extending into the passage to intercept the valve means in its radially outward movement.

6. The combination according to claim 2 wherein said valve means includes an annular member disposed about the rotatable element and split axially along a radial plane thereof, and fastener means connecting said annular member with the element for rotation therewith, one of said annular member and said fastener means being constructed of said material.

7. The combination according to claim 6 wherein the portion of said annular member diametrically opposite the split therein is fastened to said element and the annular member is constructed of said material.

8. The combination according to claim 7 further comprising abutment means mounted on said element for rotation therewith and extending into said passage adjacent the portions of said member adjoining the split to limit radially outward movement thereof.

9. The combination according to claim 6 wherein said annular member is split axially along a plurality of radial planes thereof to form a series of segments spaced circumferentially about the element, said fastener means connecting each segment with the element for rotation therewith.

10. The combination according to claim 9 wherein the fastener means includes a pin-like member connecting each segment with the element and having a tensile strength adapted to yield at speeds above said range.

11. The combination according to claim 10 wherein the pin-like member extends through the segment in a radial plane thereof.

12. The combination according to claim 9 wherein the fastener means includes a pin-like member connecting each segment with the element and having a shear strength adapted to yield at speeds above said range.

13. The combination according to claim 12 wherein the pin-like member extends into the segment along a parallel to the axis of the annular member.

14. The combination according to claim 9 wherein the fastener means includes a tube connecting each segment with the elements and having a tensile strength adapted to yield at speeds above said range, and a core extending through the tube and having flanged ends spaced from the ends of the tube to allow for limited elongation thereof at the upper limit of said range.

15. The combination according to claim 9 further comprising abutment means mounted on the element for rotation therewith and extending into the passage adjacent each segment to limit radially outward movement thereof.

16. The combination according to claim 9 wherein the annular member is split along each intersection of a diametrical plane thereof to form opposing semicircular segments and the fastener means includes a pin-like member extending through the element along a diametrical plane thereof substantially perpendicular to said first named diametrical plane and having a tensile strength adapted to yield at speeds above said range.

17. The combination according to claim 16 further comprising abutment means operable to limit the radially outward movement of the segments.

18. The combination according to claim 17 wherein the abutment means includes pin-like members so interconnecting the corresponding ends of the segments as to limit the outward separation thereof.

19. The combination according to claim 9 wherein the annular member is split along each intersection of a diametrical plane thereof to form opposing semicircular segments, the center portion of each segment being fastened to the element, and the annular member is constructed of said material.

20. The combination according to claim 2 wherein the valve means includes a sleeve disposed about the element and slotted axially along a plurality of radial planes thereof to form a series of axially extending strips therein spaced circumferentially about the element, each of said strips being constructed of said material.

21. The combination according to claim 20 wherein the valve means further comprises means engaging the ends of the sleeve and operating to bias the ends toward one another.

22. The combination according to claim 2 wherein the valve means includes a sleeve disposed about the element, said sleeve being recessed along a plurality of radial planes thereof to form a series of axially extending clefts circumferentially spaced about the sleeve and parting it into a series of axially extending tongues, each of said tongues being constructed of said material.

23. The combination according to claim 2 further comprising annular partition means disposed in said annular passage and dividing it into inner and outer annular passages, and abutment means mounted in said partition means for movement along a radial plane thereof and operably engageable by said valve means in said inner passage to move radially outwardly into said outer passage.

24. The combination according to claim 23 wherein the abutment means includes a pin-like member extending from the inner to the outer periphery of said partition means in said radial plane thereof.

References Cited in the file of this patent

UNITED STATES PATENTS

| | | |
|---|---|---|
| 1,674,950 | Crafts | June 26, 1928 |
| 1,796,508 | Dake | Mar. 17, 1931 |
| 2,314,218 | Jimreson | Mar. 16, 1943 |
| 2,477,983 | Hintz | Aug. 2, 1949 |
| 2,569,898 | Millns et al. | Oct. 2, 1951 |
| 2,674,254 | Tregillus | Apr. 6, 1954 |
| 2,733,891 | Millns et al. | Feb. 7, 1956 |
| 2,741,256 | Barton et al. | Apr. 10, 1956 |
| 2,904,326 | Panhard | Sept. 15, 1959 |
| 2,962,257 | Allingham | Nov. 29, 1960 |

FOREIGN PATENTS

| | | |
|---|---|---|
| 692,527 | Great Britain | June 10, 1953 |